June 20, 1944.  L. R. MUSKAT  2,352,114

AUTOMATIC WEIGHING DEVICE

Filed Nov. 2, 1940  6 Sheets-Sheet 1

Fig.1

Witness:
E. Camporini

Inventor:
Louis R. Muskat,
By:
Arthur M Nelson
Attorney.

June 20, 1944.  L. R. MUSKAT  2,352,114
AUTOMATIC WEIGHING DEVICE
Filed Nov. 2, 1940   6 Sheets-Sheet 5

Witness:
E Camporini

Inventor:
Louis R. Muskat,
By: Arthur M Nelson
Attorney.

Patented June 20, 1944

2,352,114

UNITED STATES PATENT OFFICE 2,352,114

AUTOMATIC WEIGHING DEVICE

Louis R. Muskat, Oak Park, Ill., assignor, by mesne assignments, to L. R. Muskat, Peter Muskat, Delbert Muskat, Nina L. Muskat, and Edna C. Muskat, collectively, doing business as Triangle Package Machinery Co., Chicago, Ill.

Application November 2, 1940, Serial No. 363,972

3 Claims. (Cl. 249—55)

This invention relates to improvements in automatic weighing devices and it consists of the matters hereinafter described and more particularly pointed out in the appended claims.

In the automatic weighing of materials, it is desirable to complete the weighing operation as rapidly as possible. To attain this result, it is essential that the materials be discharged rapidly to the scale pan or receptacle, as the case may be. However, when the material is thus fed or discharged rapidly, it is difficult to stop the flow at just the right instant, which will give the exact predetermined weight desired.

The general object of the invention is to provide an automatic weighing device in which the material to be weighed may be fed or discharged rapidly into the weighing pan or receptacle and yet so controlled that the exact predetermined quantity of material will be weighed out.

Another object of the invention is to provide an automatic weighing device in which means are provided for feeding a relatively large amount of material during the initial part of the weighing operation and to modify the rate of feed through the action of the weighing mechanism when a predetermined amount of material has been fed or discharged.

Again, it is an object of the invention to provide a device of this kind which is simple in construction and which will give trouble-free operation over a long period of time.

The above mentioned objects of the invention, as well as others, together with the advantages thereof, will more fully appear as the specification proceeds to describe the preferred embodiments of the invention.

In the drawings:

Fig. 9 is a diagrammatic view illustrating another electric circuit which may be advantageously used in connection with the structure showing in Figs. 1 to 6 and which will also be more fully referred to.

Referring now in detail to those embodiments of the invention illustrated in the drawings: 15 indicates as a whole the generally open upright framework of the device and which is supported on a suitable base 16. The frame includes pairs of front and rear upright corner posts 17 and 18 connected together at the top by horizontal frame members 19. Said corner posts also support horizontal intermediate frame members 20 disposed between the base 16 and the frame members 19.

A hopper 21 is supported on certain of the frame members 19 so as to be disposed at the upper rear end of the frame 15. This hopper receives the bulk material operated upon. It has a downwardly opening spout 22 through which said material is discharged upon certain conveyors later to be described. Certain adjustably mounted gates 23 and 24 are associated with the hopper whereby the flow of material from the hopper, into the before mentioned conveyors, may be regulated. As these gates form no particular part of the present invention, it is not necessary to describe them in detail herein or to illustrate them in more detail than appears in Fig. 3.

A horizontal platform 25 is supported upon the frame members 20 by means of rubber blocks 25a and a plurality of conveyor supporting platforms or plates 26 and 27 respectively (see Fig. 4) are resiliently supported above said platform 25 by means of sets of corner springs 28.

Figure 3:
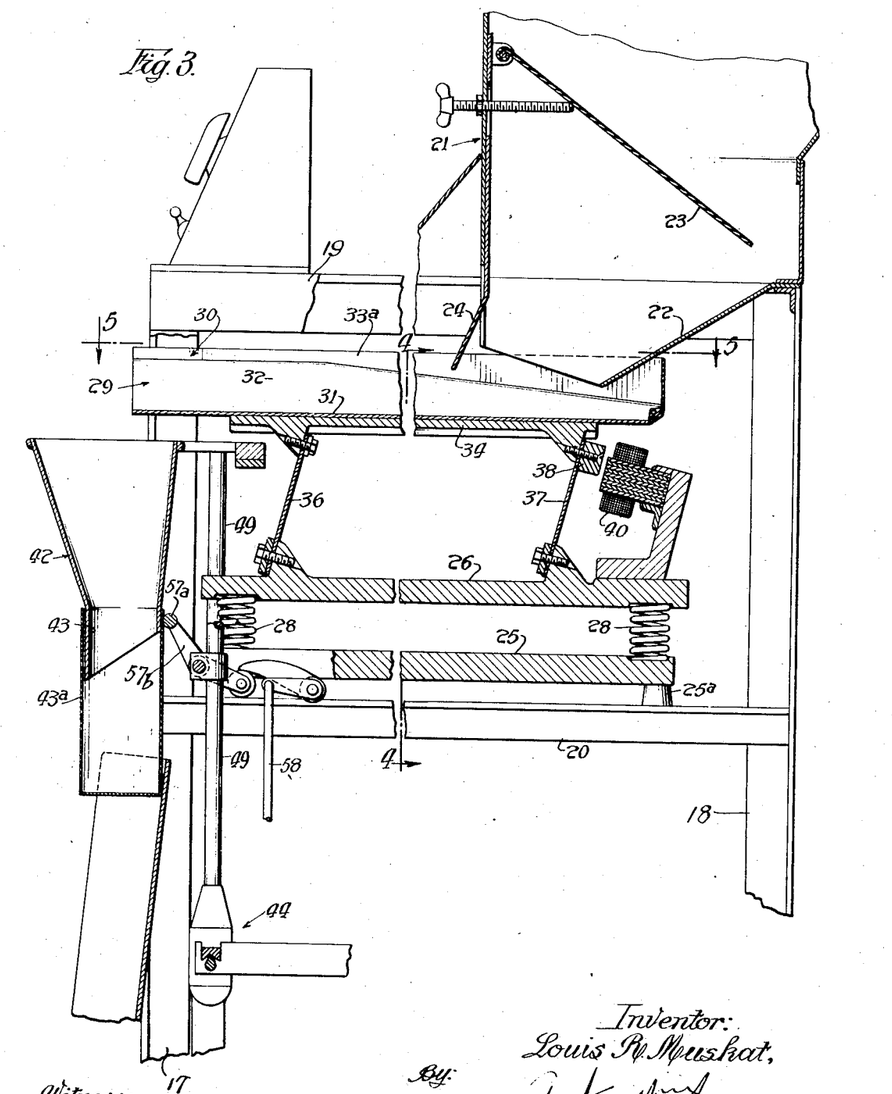
Fig. 3 is a detail longitudinal vertical sectional view, on an enlarged scale, through the upper end portion of the device as taken on the line 3—3 of Fig. 2.
Figure 4:
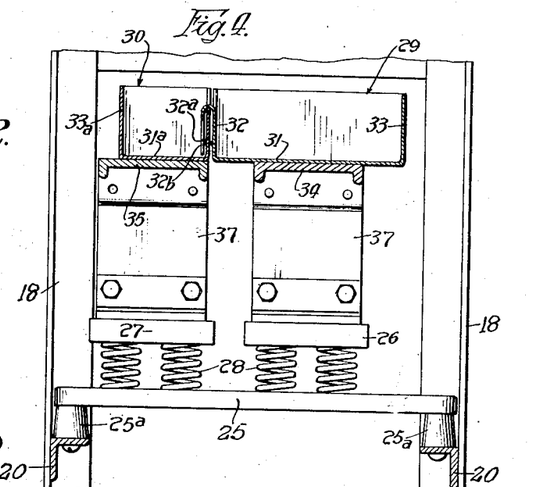
Fig. 4 is a detail transverse vertical sectional view through a part of the device on the scale of Fig. 3 as taken on the line 4—4 of said Fig. 3.
Figure 5:
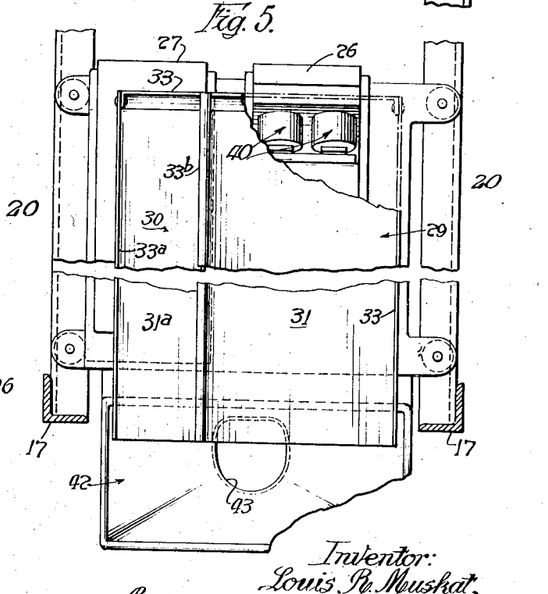
Fig. 5 is a detail horizontal sectional view through a part of the device as taken on the line 5—5 of Fig. 3.

Between the hopper 21 and the platforms 26 and 27 is located a plurality of trough or tray-like conveyors 29 and 30 respectively, see Fig. 4. The conveyor 29 is wider than the conveyor 30 and therefore has greater capacity because it will carry more material than the conveyor 30. These conveyors, which are herein shown as disposed in closely adjacent side-by-side arrangement in a horizontal plane, extend longitudinally from front to rear of the device. Each conveyor, which is open at the top and at the front end but it closed at the rear end, includes a bottom 31—31a and inner and outer upright side walls 32—32a and 33—33a respectively. The inner side walls 32—32a of each conveyor increase in height from their rear end forwardly as appears in Fig. 3. The wall 32 is formed with a bent flange 32b which overhangs the wall 32a so as to close off the space separating said conveyors as best appears in Fig. 4.

The closed rear ends of said conveyors 29 and 30 are both disposed beneath the discharge spout 22 of the hopper 21 so that material is discharged from the hopper simultaneously into the rear end of both conveyors as will be apparent from Fig. 3.

Each conveyor is mounted upon a relatively rigid horizontal supporting plate 34 and 35 respectively, see Fig. 4, and each of these plates is supported from the associated plates 26 and 27 by pairs of front and rear resilient strip-like deflectable arms 36 and 37 respectively. The arms 36 and 37 are inclined upwardly and rearwardly from the plates 26 and 27 and flex, as will later appear, so that the conveyors carried thereby may be vibrated. At the rear end of each supporting plate 34 and 35 is located an armature 38 and 39 respectively. In Fig. 3 only one armature appears, but both of them are indicated diagrammatically in Fig. 8.

Coacting with the armature 38 and 39 are electromagnets 40 and 41 respectively, having their cores disposed in operative position with respect to the associated armatures. When the magnets are energized, they attract the armatures 38—39 and deflect the arms 36—37 and impart the rearward part of the vibration to the conveyors. This deflection is against the spring action of the arms 36—37, so that they store energy therein. When said magnets are deenergized, said stored up energy is released and the spring arms 36—37 return to normal position and impart the forward part of the vibration to the conveyors 29 and 30.

The open front end of both conveyors overhang and are adapted, jointly or individually to discharge into the open top end of a spout 42 arranged at the front of the machine. Said spout has a bottom end neck 43 (see Fig. 3) over which a container 43a, as for example, a bag may be slipped to be filled with the material discharged into the spout from the conveyors. This spout is operatively supported as will later appear, by a part of a weighing mechanism in the form of a scale 44 which is mounted on the forward top end portion of the base 16.

Figures 6, 7:
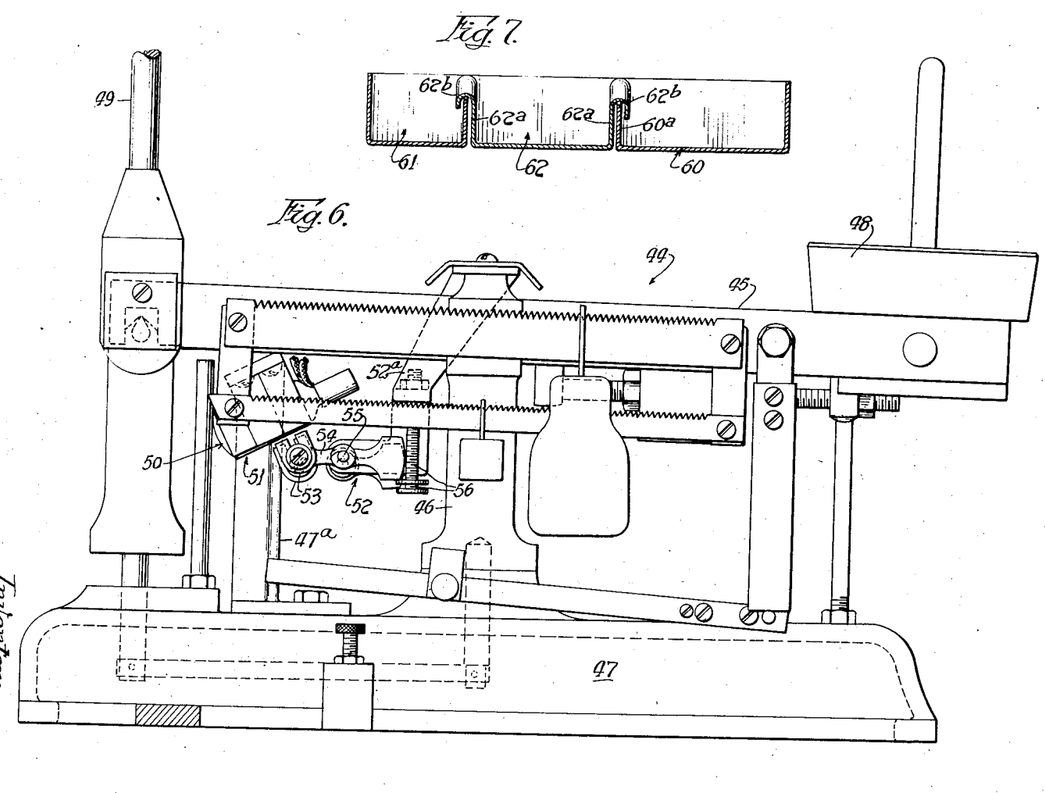
Fig. 6 is a view in side elevation, on an enlarged scale of one form of weighing machine that may be advantageously employed in the improved automatic weighing device.
Fig. 7 is a transverse vertical detail sectional view showing a modified form of vibrating conveyor or tray arrangement that may be advantageously used in the improved device and which arrangement will be more fully referred to later.

As best shown in Fig. 6, said mechanism is in the form of a conventional weighing scale having a tilting beam 45, suitably fulcrumed on an upright post 46 rising from a base 47.

One end of the beam carries a weight 48 and the other end of said beam has operatively connected thereto the bottom end of upright stems or rods 49. Spout 42 before mentioned, is operatively secured to and supported upon the upper end of said stems or rods which are guided for vertical movement in any suitable manner.

Rising from that end of the base associated with the load end of the beam 45 is a post 47a (see Fig. 6) and the mercury containing parts of a pair of switches 50 and 51 respectively, of the so-called magnetic type are mounted thereon. Such switches may be purchased in open market. Associated with each switch is an actuator 52 carried by a bracket 52a that is fixed to the beam 45 so as to move in unison with the load end thereof. Each actuator includes a permanent magnet 53. When the load end of the beam 45 descends, the magnets 53 move away from the associated switches 50 and 51 so that the mechanisms in said switches open those parts of the circuit of the device which they control. When the load end of the beam rises, the magnets 53 move toward the switches 50 and 51 and the influence of said magnets on the mechanism of said switches closes the associated parts of the circuits.

As herein shown, each actuator includes a lever 54 which carries an associated magnet 53 at one end. The other end of said lever is weighted and is so disposed as to be operatively engaged by an adjusting screw 56. By turning the proper screw 56, the associated magnet 53 may be adjusted or positioned away from or toward the mercury containing part of the associated switch. With such an adjustment, one switch may be set to open its associated part of a circuit when one predetermined amount or weight of material, approaching the full amount or weight for each bag 43, has been discharged into the spout 42. Likewise the other switch may be set to open its associated part of the circuit when said full amount of material has been discharged into the spout. In the present instance, the switch 50 is associated with the magnet 40 that controls the vibration of the conveyor 29 and the switch 51 is associated with the magnet 41 that controls the conveyor 30.

At this time, it is pointed out that suitable means is provided removably to clamp the container 43a to the neck 43 of the spout 42 but as this means forms no particular part of the present invention, it is neither illustrated nor will it be described in detail herein. However, it includes a gripper 57a mounted on a lever arm 57b carried by the rods 49 and operable by means of a spring raised foot treadle 57 and associated rod 58, the treadle being pivoted at 59 to the base 16. When the operator steps on the treadle, the gripper is caused to release the bag 43a for removal from the neck 43. After a new bag has been applied to said neck and the treadle is released, the parts function to cause the roller to grip the bag upon said spout.

Figure 1:
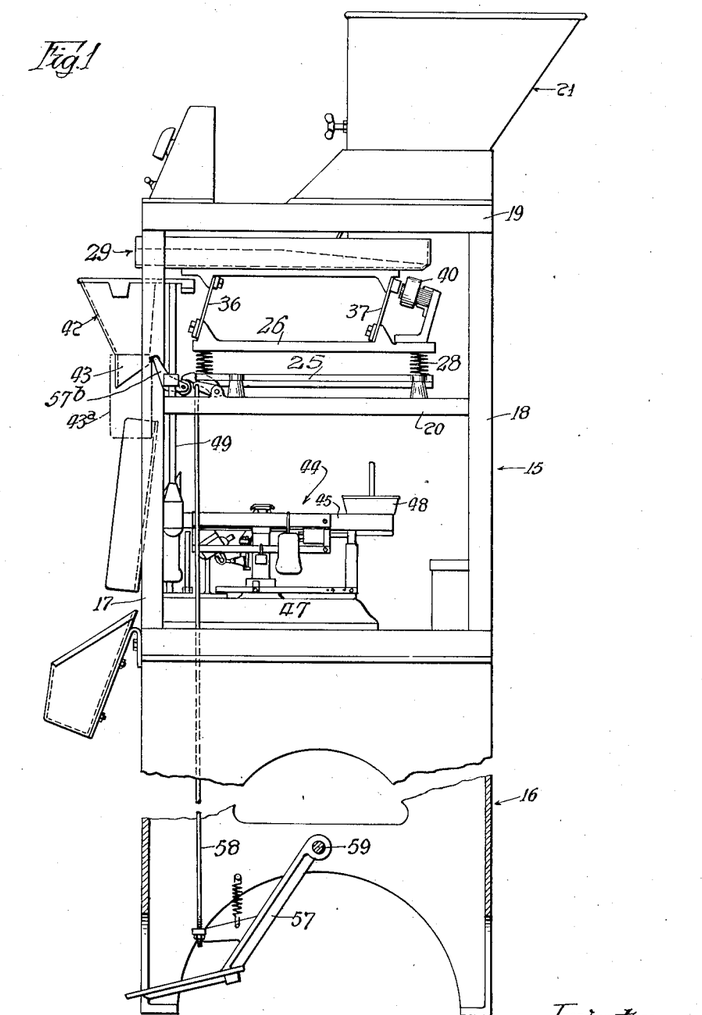
Fig. 1 is a view in side elevation of an automatic weighing device embodying one form of the invention, with a part of the base appearing in vertical section better to show the construction involved.
Figure 2:
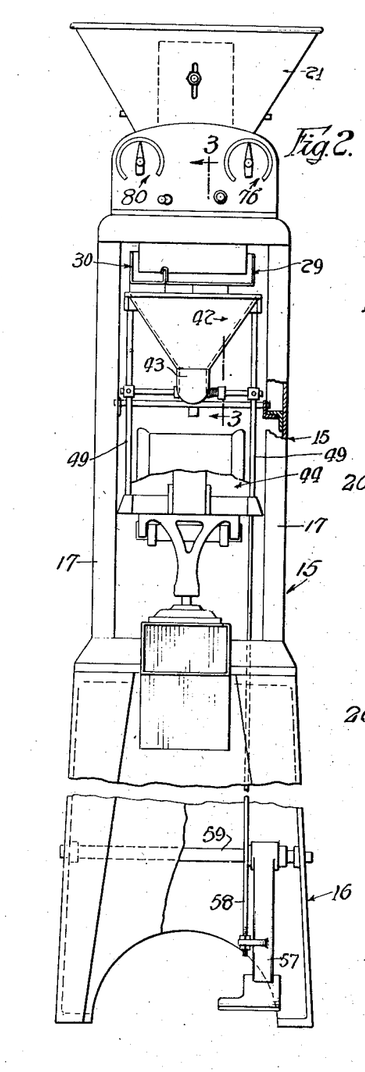
Fig. 2 is a view in front end elevation of the device appearing in Fig. 1.

In Figs. 2 and 4, I have shown the plurality of conveyors as being two in number, but this number may be increased to three or more if desired. In Fig. 7, I have shown the three conveyors so as to include side and intermediate ones which bear the numbers 60, 61 and 62 respectively. In this instance, the side conveyor 60 is the widest and has the greatest capacity, the intermediate conveyor is the next in width and capacity and the other side conveyor 61 is the narrowest and has the least capacity. With such a side-by-side, three-conveyor arrangement, one convenient way to close off the top of the space separating said conveyors, is to provide the side walls 62a of the intermediate conveyor with flanges 62b which overhang the top edges of the walls 60a and 61a of the conveyors 60 and 61 adjacent said side walls 62a—62a.

With the two conveyors arranged side-by-side as shown in Figs. 1 to 6 of the drawings, they may be vibrated at different relative speeds in a weighing and packaging operation and these are as follows, assuming that each package is to contain a pound of the material:

If desired, the wide conveyor 29 may be vibrated at a high speed and the narrow conveyor may be vibrated at a slower speed and then when about 14 or 15 ounces of material has been delivered into the bag 43a, the vibration and feed of the wide conveyor is stopped and the narrow conveyor continues vibrating at slow speed to feed the last ounce or two with a dribble action, stopping entirely when one pound has been deposited in the bag 43a.

A second way in which the conveyors may be caused to operate is as follows: Both conveyors 29 and 30 may be caused to vibrate at high speed and then when about 14 or 15 ounces of material has been fed into the bag 43a, the vibration of the conveyor 29 is stopped and the vibration of the conveyor 30 is continued but at a slower speed to feed the last ounce or two, stopping entirely when one pound has been deposited in the bag 43a.

A third way in which the conveyors may be caused to operate is as follows: Both conveyors 29 and 30 may be caused to vibrate at high speed and then when about 14 ounces of material has been fed into the bag, vibration of the conveyor 29 is stopped and the feed is entirely from the narrow conveyor 30 at reduced speed. When about 15 ounces has been weighed out, the speed of vibration is further reduced, said conveyor stopping entirely when the full 16 ounces has been delivered into the bag 43a.

When the device is provided with the three conveyors 60, 61 and 62 as in Fig. 7, all conveyors may be caused to vibrate simultaneously to provide a bulk feed up to about 12 ounces. At this point the vibration of the wider conveyor may be stopped, the vibration of the other two conveyors continuing until about 14 ounces have been delivered at which time the intermediate one 62 is stopped, the conveyor 61 continuing its vibration to provide the dribble feed and which latter conveyor is stopped when 16 ounces of material has been delivered to the bag 43a.

Figure 8:
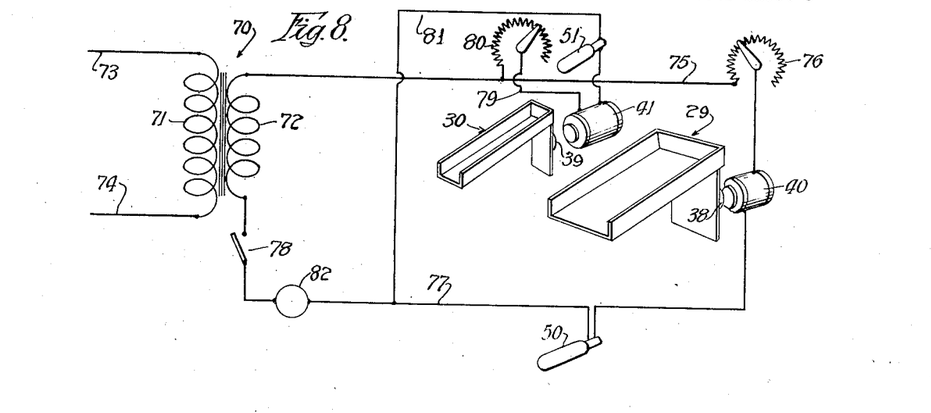
Fig. 8 is a diagrammatic view illustrating an electric circuit which may be advantageously used in connection with the structure shown in Figs. 1 to 6 inclusive of the drawings and which will be more fully referred to later.
Figure 9:
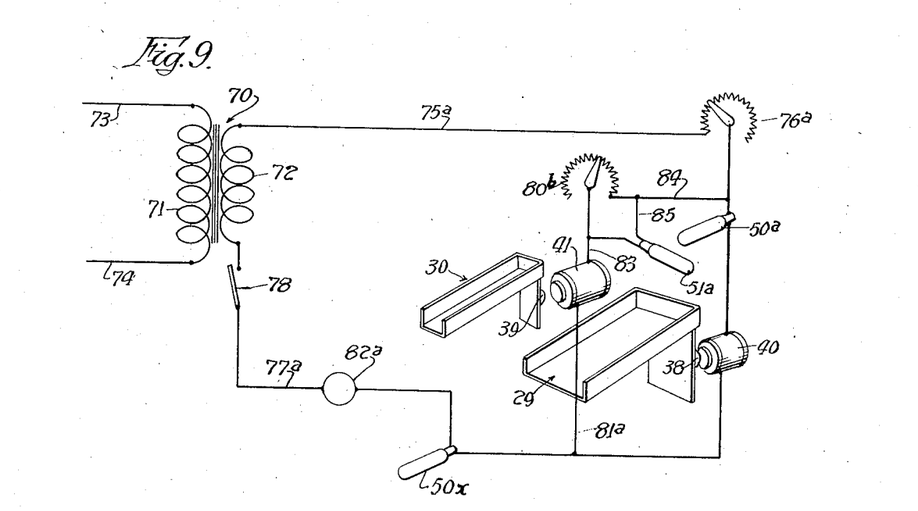
Figure 10:
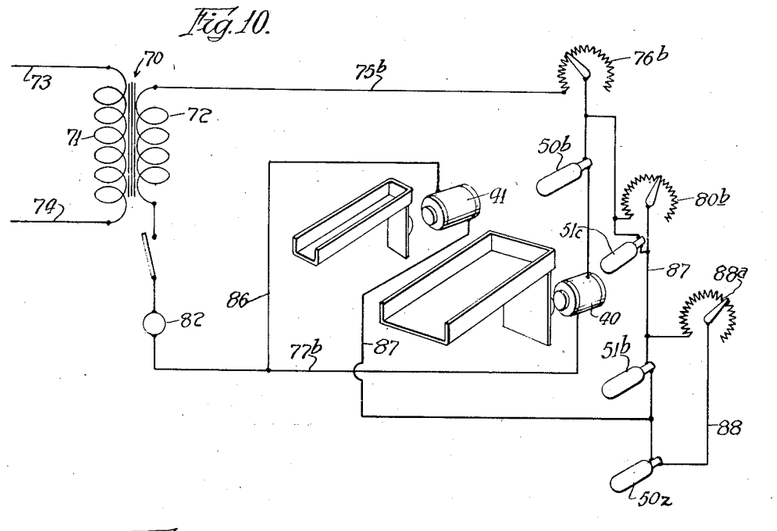
Fig. 10 is a diagrammatic view illustrating still another electric circuit which may be advantageously used in connection with the construction of said Figs. 1 to 6 inclusive.
Figure 11:
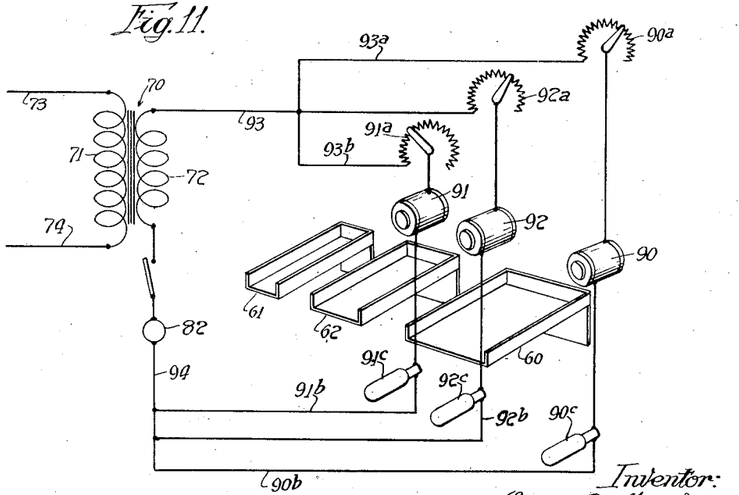
Fig. 11 is a diagrammatic view illustrating a circuit which may be used with the device when it includes the conveyor or tray arrangement shown in Fig. 7.

In Fig. 8 I have illustrated a circuit arranged to operate the device in accordance with the first mentioned way. Fig. 9 illustrates a modified form of circuit whereby the device operates according to the second mentioned way. Fig. 10 illustrates a further modified form of circuit whereby the device operates as per the third mentioned way. Fig. 11 illustrates a circuit whereby the three conveyor types of device operates as per the fourth mentioned way.

Referring now to the circuit shown in Fig. 8, 70 indicates a transformer having primary and secondary windings 71—72 and the primary winding is connected to a source of alternating current furnished by the lines 73 and 74. One end of the secondary winding 72 is connected to the electro magnet 40 (for conveyor 29) by a line 75, a manually adjustable rheostat 76 being incorporated in the line. A line 77 connects the other end of the secondary winding with the magnet 40, the switch 50, before mentioned being disposed in this line for controlling the same automatically when a manually operated switch 78, also disposed in said line, is closed. The switch 78 is a service switch and when the same is in an open condition, the machine is inoperative.

A line 79 connects the line 75 with the magnet 41 for the conveyor 30 and a manually adjustable rheostat 80 is arranged in the line 79. A line 81 connects the line 77 with the magnet 41, the switch 51 before mentioned being disposed in said line 81 for controlling the same automatically when the switch 78 is closed. In the line 77 is a lamp 82. Assume that the rheostat 76 is so set that substantially little or no resistance is offered to current passage through the lines 75—77. Also, assume that the rheostat 80 has been manually set to offer more resistance to the passage of current through the lines 75—79—81 and 77.

Assume the device to be in operation with the circuit just described. When about 14 ounces of material has been delivered into the bag 43a, the load end of the beam 45 descends so that the magnet 53 for the switch 50 moves away therefrom, which causes said switch to open and break the circuit to the magnet 40 so that vibration of the conveyor 29 is stopped. Current, however, is still passing through the magnet 41 by means of lines 75—79—81 and 77 but as the rheostat 80 in line 79 has been set to offer resistance to the passage of current through said lines, the conveyor 30 while still vibrating, has a lesser magnitude of vibration, and therefore operates at a relatively slow speed. This provides the dribble feed for the last two ounces of material to be delivered into the bag and when this amount has been so delivered, the load end of the beam 45 further descends to remove the magnet 53 from the influence of switch 51 thereby opening the circuit to the magnet 41 and deenergizing it.

When the switch 51 has been actuated and functions to open the circuit to the coil 41, the light 82 being in the circuit of said coil is extinguished to indicate to the operator that the proper amount or weight of material has been delivered to the bag 43a.

Both conveyors 29 and 30 are now in an inoperative condition and no more material is being fed by either one thereof. The operator then steps on the treadle 57 to release the filled bag for removal from the neck 43 of the spout 42. Another bag is applied to the spout, after which the operator releases the treadle 57. The weight 48 then causes the load end of the scale beam to swing upwardly to actuate the switches 50 and 51 to again close their parts of the circuit to the magnets 40 and 41 so that the device automatically starts a second operation.

In Fig. 9, a line 75a leads from one end of the secondary winding 72 of the transformer 70 to the magnet 40 and in this line is interposed a rheostat 76a and a switch 50a. A line 77a from the other end of the winding 72 to the magnet 40 and in this line is interposed a lamp 82a and a third switch 50x similar to the switches 50 and 51 before mentioned. The magnet 41 has one side connected by a branch 81a to the line 77a and has its other side connected by a line 83 to the arm of a rheostat 80b. The winding of rheostat 80b is connected by a line 84 to the line 75a at a point between the switch 50a and rheostat 76a. A branch 85 connects the lines 84—83 and the switch 51a is disposed in said branch. It is to be understood that the switches 50a, 51a and 50x are all mounted on the scale 44 in the manner described in connection with the switches 50 and 51 respectively, before mentioned.

In the start of a bag filling operation, current passes from one end of winding 72 through line 75a and rheostat 76a and switch 50a in said line to the magnet 40 and then through line 77a and switch 50x and lamp 82a therein, back to the other end of the winding 72 assuming switch 78 is closed as it is when the machine is being operated. Current also passes through line 75a, rheostat 76a, line 84, line 85, switch 51a therein to line 83, through the magnet 41, line 81a to line 77a in advance of the switch 50x therein. At this time both conveyors 29 and 30 are being vibrated at high speed to provide the bulk or fast feed of material up to about 14 ounces when both switches 50a and 51a will open. This opens the circuit to the magnet 40 and while the circuit for the magnet 41 is broken at the switch 51a, current still passes from line 75a, rheostat 76a, branch 84, rheostat 80b, line 83 through said magnet and line 81a back to line 77a in advance of the switch 50x. The resistance afforded by both rheostats slows down the vibration of the conveyor 30 to dribble feed the last two ounces, and when said last two ounces have been so fed, the switch 50x is caused to open, and break the circuit to the magnet 41 to stop the vibration of the conveyor 30. The filled bag is released by actuating the treadle 57 and then removed and an empty bag replaced on the spout. The treadle is then released for the start of another operation.

In the circuit shown in Fig. 10, a line 75b is connected to one end of the transformer winding 72 and leads through a rheostat 76b and a switch 50b to the magnet 40 which is connected by a line 77b with the other side of the winding 72. One side of the magnet 41 is connected by a branch 86 to the line 77b. The other side of said magnet is connected by a line 87 with the line 75b at a point between the rheostat 76b and switch 50b. In said line 87 is disposed a rheostat 80b and switches 51b and 51c. A line 88 is connected at one end to the line 87 at a point between the magnet 41 and switch 51b and is connected at its other end to said line 87 at a point between the rheostat 80b and switch 51b. In the line 88 is a rheostat 88a and a switch 50z similar to the switches 50b, 51b and 51c.

In the start of an operation of the machine, current flows through line 75b, rheostat 76b, switch 50b, through magnet 40 to line 77b to the other end of the winding 72. Current also flows from line 75b, rheostat 76b, line 87, switches 51c—51b therein to one side of the magnet 41 and then through branch 86 to a part of line 77b and back to the other end of the winding 72. Thus both conveyors are vibrated at relatively high speed. When about 14 ounces of material have been delivered into the bag 43a, the switch 50b opens and breaks circuit to the magnet 40 to stop vibration of the conveyor 29 and at this time the switch 51c also opens. However, current at this time flows through line 75b, rheostat 76b, line 87 and rheostat 80b and switch 51b therein to one side of magnet 41 and out branch 86 to line 77b and then to the other side of winding 72.

Thus current flows through both rheostats 76b and 80b to induce such a resistance as cuts down the speed of vibration of the conveyor 30. The conveyor 30 vibrates at this slow speed to feed about one ounce more at which time the switch 51b opens. At this time, current must pass through the three rheostats 76b—80b and 88a as well as through the switch 50z to induce a heavy resistance to current flow to magnet 41, which further reduces the speed of vibration for the conveyor 30. The conveyor 30 vibrates at this slow speed to dribble feed the last ounce to make up the pound, at which time the switch 50z opens and breaks the circuit from the magnet so that vibration of the conveyor 30 stops.

The filled bag is removed from the spout 42 and a new bag applied thereto and operation is again automatically restarted as before.

In Fig. 11, I have shown a circuit adapted for use in a machine having the three side-by-side conveyors 60—61 and 62 respectively, as shown in Fig. 7. In this instance, said conveyors have magnets 90—91 and 92 respectively, associated therewith for vibrating the same as before. A line 93 leads from an end of the winding 72 to one side of the coil 92 and in said line is a rheostat 92a. The other side of said coil 92 is connected by a branch 92b with a line 94 leading back to the other end of the winding 72. In the branch 92b is a switch 92c similar to those hereinbefore mentioned.

Branch lines 90b and 91b also connect one side of each magnet 90 and 91 with the line 94 and in said lines 90b and 91b are switches 90c and 91c respectively. Branch lines 93a and 93b lead off from the line 93 to the other side of each of the magnets 90 and 91 and in said branches are rheostats 90a and 91a respectively.

In the operation of a device having the three conveyors mentioned and all of which discharge into the one spout 42 as before, all of said conveyors are vibrated simultaneously to provide the fast bulk feed of material to the spout. When about 14 ounces of material has thus been fed into the spout 42 and bag 43a, the switch 90c opens so that the magnet 90 is deenergized and vibration of the wide tray 60 stops. However, both magnets 92 and 91 are still in circuit and when another ounce of material has been delivered into the spout, the switch 92c opens to deenergize the magnet 92 to stop the vibration of the intermediate and next wider conveyor. At this time the circuit for the magnet 91 is still closed so that the narrow conveyor 61 is still vibrating to deliver the last ounce of material to the spout with a dribble feed. When said ounce has been so delivered, the switch 91c opens the circuit and the conveyor vibration stops. The filled bag 43a is then removed from the neck of the spout and another bag is applied thereto and the weighing operation goes on as before.

In each of the operations above described, the weighing mechanism controls the actuation of the switches and said switches are opened consecutively as the load end of the beam 45 descends. When the filled bag is removed and another bag applied to the spout, the weight end of the beam descends and lifts the load end thereof so that all of said switches again close to restart another weighing operation.

By the arrangement of the plurality of the conveyors in substantially the same plane and all discharging into the same spout, certain advantages flow. This permits full vision of all conveyors by the operator at the same time so that a better inspection of the material operated upon is possible. Also a faster operation is possible because the material operated upon is not caused to pass from one conveyor to the other before said material is discharged into the spout as occurs in certain type conveyor machines heretofore devised.

With the conveyors arranged side by side as described, in connection with the specific illustration of the invention, only one hopper is necessary to supply all of the conveyors simultaneously. With the overhang of the side wall of one conveyor with respect to the adjacent one, even though a single hopper feeds to said conveyors, it is impossible for material to enter between said conveyors, even though one conveyor is stopped and the other continues its vibrating feeding motion.

In the preferred embodiment of the invention, the material is discharged into a container in the form of a bag or carton. It should be understood that this is by way of illustration and not by way of limitation since features of the device may be advantageously employed in other arrangements. In the claims, therefore, when reference is made to means or a receptacle into which the material is discharged, it should be construed broadly to cover any form of device adapted to receive the discharged material being weighed.

Again, while in describing my invention, I have referred in detail to the form, construction and arrangement of the parts involved, the same is to be considered only in the illustrative sense so that I do not wish to be limited thereto except as may be specifically set forth in the appended claims.

I claim as my invention:

1. A device of the kind described including in combination a weighing mechanism, a plurality of conveyors arranged side by side and mounted for vibratory movement in parallel planes and arranged to deliver material simultaneously to said weighing mechanism, one of said conveyors having a relatively large capacity and the other having a relatively small capacity, means independent of each conveyor for supplying material directly thereto, electrically operated means associated with each conveyor for vibrating the same when energized, an electric circuit in which said electrically operated means are disposed, and switch means in said circuit and operated by said weighing mechanism when one predetermined amount of material has been delivered to said weighing mechanism for deenergizing that electrically operated means associated with the conveyor of larger capacity for stopping the same, said switch means also operating when another predetermined amount of material has been delivered to said weighing mechanism for deenergizing that electrically operated means associated with said conveyor of smaller capacity for stopping the same.

2. A device of the kind described including in combination, a weighing mechanism, a plurality of trough-like conveyors arranged side by side and each mounted for independent vibratory movement and arranged to deliver material simultaneously from one end to said weighing mechanism, means independent of each conveyor for supplying material directly to the other end of said conveyors, electrically operated means associated with each conveyor for vibrating the same when energized, an electrical circuit in which said electrically operable means are disposed, and switch means in said circuit and operated by said weighing mechanism when a predetermined amount of material has been delivered to said weighing mechanism for deenergizing one of said electrically operable means to stop vibration of its associated conveyor, said switch means also operating when another predetermined amount of material has been delivered to said weighing mechanism for deenergizing another of said electrically operated means to stop the associated conveyor.

3. A device of the kind described including in combination, a weighing mechanism, a bulk feed conveyor and a dribble feed conveyor in the form of a pair of wide and narrow, channel-like trays arranged adjacent each other side by side for independent vibratory movement, with one of said conveyors having a part overhanging a part of the other conveyor to close off the space between them and which conveyors simultaneously deliver material from one end to said weighing mechanism, means independent of each conveyor for supplying material to the other end of said conveyors simultaneously, electrically operated means associated with each conveyor for vibrating the same when energized, an electrical circuit in which said electrically operated means are disposed, a switch means in said circuit and operated by said weighing mechanism when a predetermined amount of material has been delivered to said weighing mechanism for deenergizing said electrically operated means to stop the vibration of the bulk feed conveyor, said switch means also operating when another predetermined amount of material has been delivered to said weighing mechanism for deenergizing another of said electrically operated means to stop the vibration of said dribble feed conveyor.

LOUIS R. MUSKAT.